(12) United States Patent
Hu et al.

(10) Patent No.: US 7,595,894 B2
(45) Date of Patent: Sep. 29, 2009

(54) PROFILOMETRY APPARATUS AND METHOD OF OPERATION

(75) Inventors: Qingying Hu, Clifton Park, NY (US); Magdi Naim Azer, Niskayuna, NY (US); Kevin George Harding, Niskayuna, NY (US); John Broddus Deaton, Jr., Niskayuna, NY (US); Sudhir Kumar Tewari, West Chester, OH (US)

(73) Assignee: General Electric Company, Niskayuna, NY (US)

( * ) Notice: Subject to any disclaimer, the term of this patent is extended or adjusted under 35 U.S.C. 154(b) by 250 days.

(21) Appl. No.: 11/445,515

(22) Filed: Jun. 2, 2006

(65) Prior Publication Data

US 2007/0279639 A1 Dec. 6, 2007

(51) Int. Cl.
*G01B 11/24* (2006.01)
(52) U.S. Cl. .................................................. 356/604
(58) Field of Classification Search ................ 356/512, 356/605, 604
See application file for complete search history.

(56) References Cited

U.S. PATENT DOCUMENTS

| | | | |
|---|---|---|---|
| 4,611,111 A | | 9/1986 | Baheti et al. |
| 4,952,149 A | * | 8/1990 | Duret et al. ................ 433/215 |
| 5,289,264 A | * | 2/1994 | Steinbichler .............. 356/605 |
| 5,361,308 A | * | 11/1994 | Lee et al. .................... 382/204 |
| 5,517,420 A | | 5/1996 | Kinsman et al. |
| 5,814,784 A | | 9/1998 | Kinsman et al. |
| 5,847,832 A | * | 12/1998 | Liskow et al. .............. 356/613 |
| 6,504,127 B1 | | 1/2003 | McGregor et al. |
| 6,639,685 B1 | * | 10/2003 | Gu et al. .................... 356/603 |
| 6,995,334 B1 | * | 2/2006 | Kovacevic et al. ...... 219/121.63 |
| 7,286,246 B2 | * | 10/2007 | Yoshida ..................... 356/605 |
| 7,298,499 B2 | * | 11/2007 | Fournier .................... 356/605 |
| 2002/0057438 A1 | * | 5/2002 | Decker ....................... 356/601 |
| 2002/0198667 A1 | | 12/2002 | Dodge et al. |
| 2004/0060639 A1 | | 4/2004 | White |
| 2004/0133298 A1 | * | 7/2004 | Toyserkani et al. ......... 700/166 |
| 2005/0006363 A1 | | 1/2005 | Hsu et al. |

(Continued)

FOREIGN PATENT DOCUMENTS

DE 19519520 12/1996

(Continued)

OTHER PUBLICATIONS

M. Takeda et al., "Fourier transform profilometry for the automatic measurement of 3-D object shapes," Applied Optics, vol. 22, No. 24, Dec. 15, 1983.

(Continued)

*Primary Examiner*—Gregory J Toatley, Jr.
*Assistant Examiner*—Scott M Richey
(74) *Attorney, Agent, or Firm*—Penny A. Clarke

(57) ABSTRACT

A profilometry apparatus is provided. The profilometry apparatus includes a fringe projection device configured to project a fringe pattern on an object and an optical unit configured to capture an image of a distorted fringe pattern modulated by the object. The profilometry apparatus also includes a signal processing unit configured to process the captured image from the optical unit to filter noise from the image and to obtain real-time estimation of parameters associated with manufacture or repair of the object.

28 Claims, 6 Drawing Sheets

U.S. PATENT DOCUMENTS

2005/0103767 A1    5/2005  Kainec et al.
2005/0280831 A1*  12/2005  Fujiwara et al. ............. 356/603

FOREIGN PATENT DOCUMENTS

| JP | 01075180 | 3/1989 |
| WO | 9736144 | 10/1997 |
| WO | WO00/41836 A1 | 7/2000 |
| WO | WO00/41837 A1 | 7/2000 |
| WO | WO02/103567 A1 | 12/2002 |

OTHER PUBLICATIONS

EP Search Report, EP 07112216, Oct. 5, 2007.
JP01075180 Abstract, Mar. 20, 1989.
DE19519520 Abstract, Dec. 5, 1996.

* cited by examiner

PROFILOMETRY APPARATUS AND METHOD OF OPERATION

BACKGROUND

The invention relates generally to a profilometry apparatus, and more particularly, to a profilometry apparatus for providing real-time measurement of parameters of an object in a machining process.

Various types of machining processes are known and are in use for manufacturing and repairing parts. For example, laser consolidation systems are used to form functional components that are built layer by layer from a computer-aided design (CAD) without using any molds or dies. Typically, such systems employ a laser beam to melt a controlled amount of injected powder onto a base plate to deposit the first layer and then create subsequent layers by melting powder onto previously deposited layers. Unfortunately, due to process complexity of such systems it is very difficult to obtain the height of accumulated layers and get an instantaneous three-dimensional (3D) measurement of the volume of the weld-pool.

Certain systems employ a two-dimensional (2D) viewing system for monitoring the borders of the weld-pool while the system is in operation. However, such viewing systems provide a rough estimate of the weld area and do not provide a measurement of the weld-pool volume and the height of the accumulated layers. Certain other systems employ off-machine measurement methods to measure the 3D volume of the weld-pool. Such measurement technique requires the machining process to be stopped and to remove the part from the system for measuring the volume of the weld-pool. Furthermore, certain systems employ sensors for measuring the height of the accumulated layers. However, such sensors do not have the required measurement resolution, accuracy or the measurement range to provide a reliable measurement.

Accordingly, there is a need for a profilometry apparatus that provides an accurate measurement of the 3D weld-pool volume and height of the accumulated layers of a part formed by a laser consolidation process. Furthermore, it would be desirable to provide a profilometry apparatus that can provide an on-line measurement of the parameters of an object formed by a machining process that can be used to control the process parameters of the machining process.

BRIEF DESCRIPTION

Briefly, according to one embodiment a profilometry apparatus is provided. The profilometry apparatus includes a fringe projection device configured to project a fringe pattern on an object and an optical unit configured to capture an image of a distorted fringe pattern modulated by the object. The profilometry apparatus also includes a signal processing unit configured to process the captured image from the optical unit to filter noise from the image and to obtain real-time estimation of parameters associated with manufacture or repair of the object.

In another embodiment, a manufacturing assembly is provided. The manufacturing assembly includes a machining system having process parameters and configured to manufacture or repair an object and a profilometry apparatus configured to provide a real-time estimation of parameters associated with the manufacture or repair of the object from a single image generated from the profilometry apparatus. The profilometry apparatus includes a fringe projection device configured to project a fringe pattern on the object, an optical unit configured to capture an image of a distorted fringe pattern modulated by the object and a signal processing unit configured to process the captured image from the optical unit to filter noise from the image and to obtain real-time estimation of the parameters associated with the manufacture or repair of the object. The manufacturing assembly also includes a control system configured to adjust the process parameters of the machining system based upon the estimated parameters from the profilometry apparatus.

In another embodiment, a laser consolidation system is provided. The laser consolidation system includes a laser consolidation nozzle configured to form an object by providing a powder material in a laser generated melt pool and a fringe projection arm coupled to the laser consolidation nozzle and configured to generate a fringe pattern on a top surface of the object. The laser consolidation system also includes an optical unit configured to capture an instantaneous image of a distorted fringe pattern corresponding to the object and a signal processing unit coupled to the optical unit and configured to process the instantaneous image from the optical unit to filter noise from the image and to estimate parameters associated with the manufacture or repair of the object through Fourier Transform analysis.

In another embodiment, a method of controlling a process for manufacturing an object is provided. The method includes projecting a fringe pattern on the object and capturing an instantaneous image of a distorted fringe pattern corresponding to the object. The method also includes processing the captured image to filter noise image and to estimate parameters associated with the manufacture or repair of the object through Fourier Transform analysis and controlling process parameters for the manufacturing process in response to the estimated parameters associated with the manufacture or repair of the object.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical illustration of a laser consolidation system having a profilometry apparatus in accordance with aspects of the present technique.

FIG. 2 is an exemplary configuration 30 of the laser consolidation nozzle 14 of FIG. 1 having the profilomeotry apparatus 12 in accordance with aspects of the present technique.

DETAILED DESCRIPTION

Figure 1:
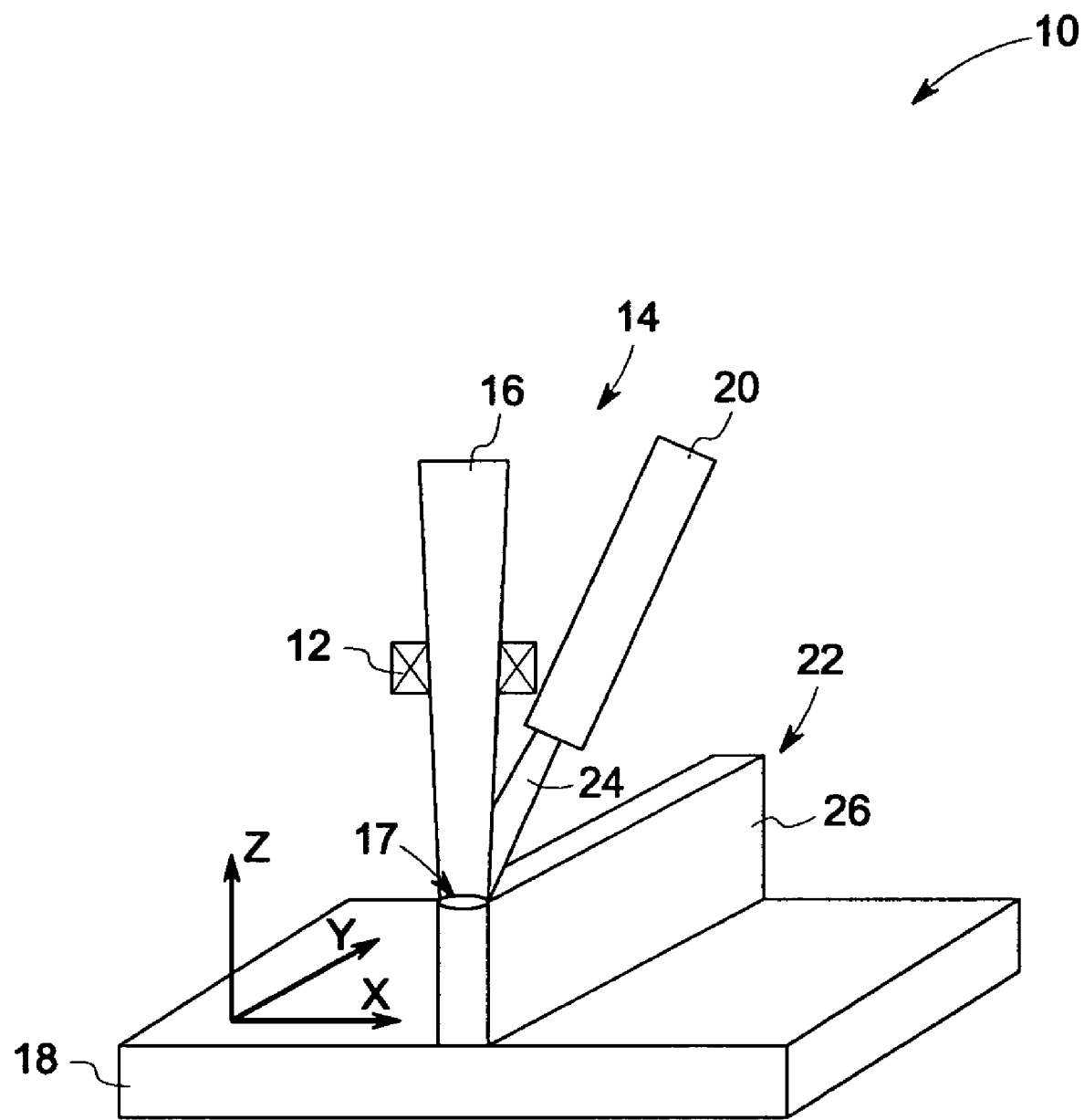

As discussed in detail below, embodiments of the present technique function to provide a real-time measurement of parameters associated with a manufacturing or repair operation of an object by a machining process. In particular, the present technique employs a pattern spacing analysis for estimating the parameters from a fringe pattern corresponding to the object. The real-time measurement of these parameters is further utilized for controlling process parameters of the machining process. Referring now to the drawings, FIG. 1 illustrates a machining system such as a laser consolidation system 10 having a profilometry apparatus 12 coupled to a laser consolidation nozzle 14. The laser consolidation nozzle 14 includes a laser source 16 configured to generate a melt pool 17 on a substrate 18. Further, the laser consolidation system 10 includes nozzle 20 configured to form an object 22 by providing a powder material 24 in the laser generated melt pool 17. In particular, the laser consolidation system 10 employs a laser beam to melt a controlled amount of injected powder 24 onto the substrate 18 to deposit a first layer 26 and then create subsequent layers (not shown) by melting powder 24 onto previously deposited layers to form the object 22.

In the illustrated embodiment, the profilometry apparatus 12 is coupled to or physically attached to the laser consolidation nozzle 14 and is configured to obtain the parameters associated with manufacture or repair of the object 22. In particular, the profilometry apparatus 12 is configured to obtain the parameters associated with the weld pool 17 that may be further utilized for process control of the machining process. Examples of such parameters include volume of the melt pool 17, height of accumulated layer 26, thickness of accumulated layer 26 and so forth. As explained in detail below, the profilometry apparatus 12 employs a profilometry method such as Fourier Transform analysis for measuring such parameters without interfering with the machining or repair process.

Figure 2:
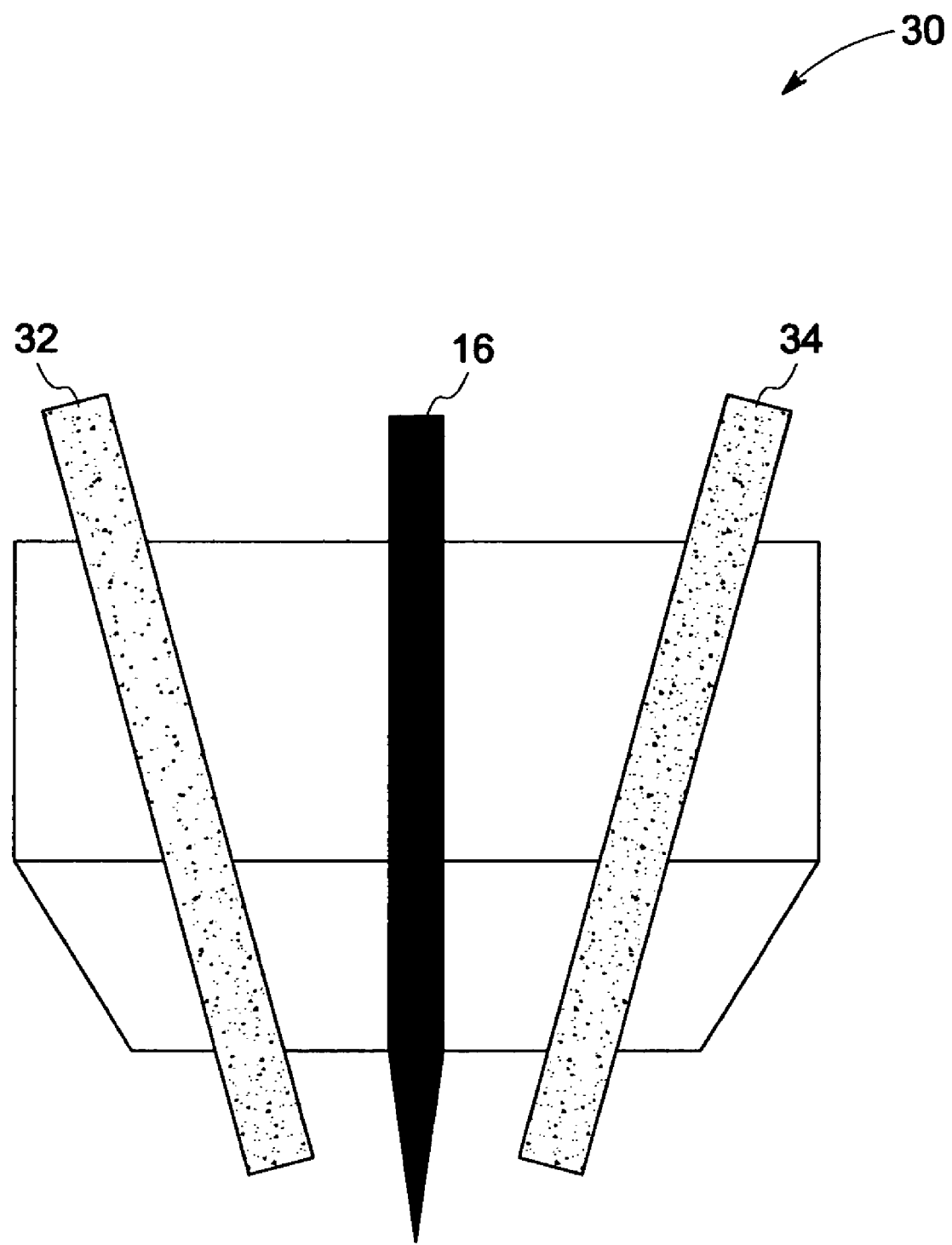

FIG. 2 is an exemplary configuration 30 of the laser consolidation nozzle 14 of FIG. 1 having the profilometry apparatus 12. In the illustrated embodiment, the laser consolidation nozzle 14 includes two arms 32 and 34 having optical components for fringe projection and image capture from the object 22 (see FIG. 1). The two arms 32 and 34 are disposed on either side of the high processing laser 16. In the illustrated embodiment, the arm 32 is configured to project a fringe pattern on the object 22 and the arm 34 is configured to capture the image of a distorted fringe pattern from the object 22. As will be appreciated by one skilled in the art different types of pattern may be projected on the object 22 via the arm 32. For example, in one embodiment, the fringe pattern includes a straight-line pattern. In one exemplary embodiment, the fringe projection arm 32 has substantially large cross-section to cover a targeted area whereas the laser 16 is focused to a point on the object 22 to provide high power density to melt the powder. The optical components of the two arms 32 and 34 for fringe projection and image capture will be described in detail below.

Figure 3:
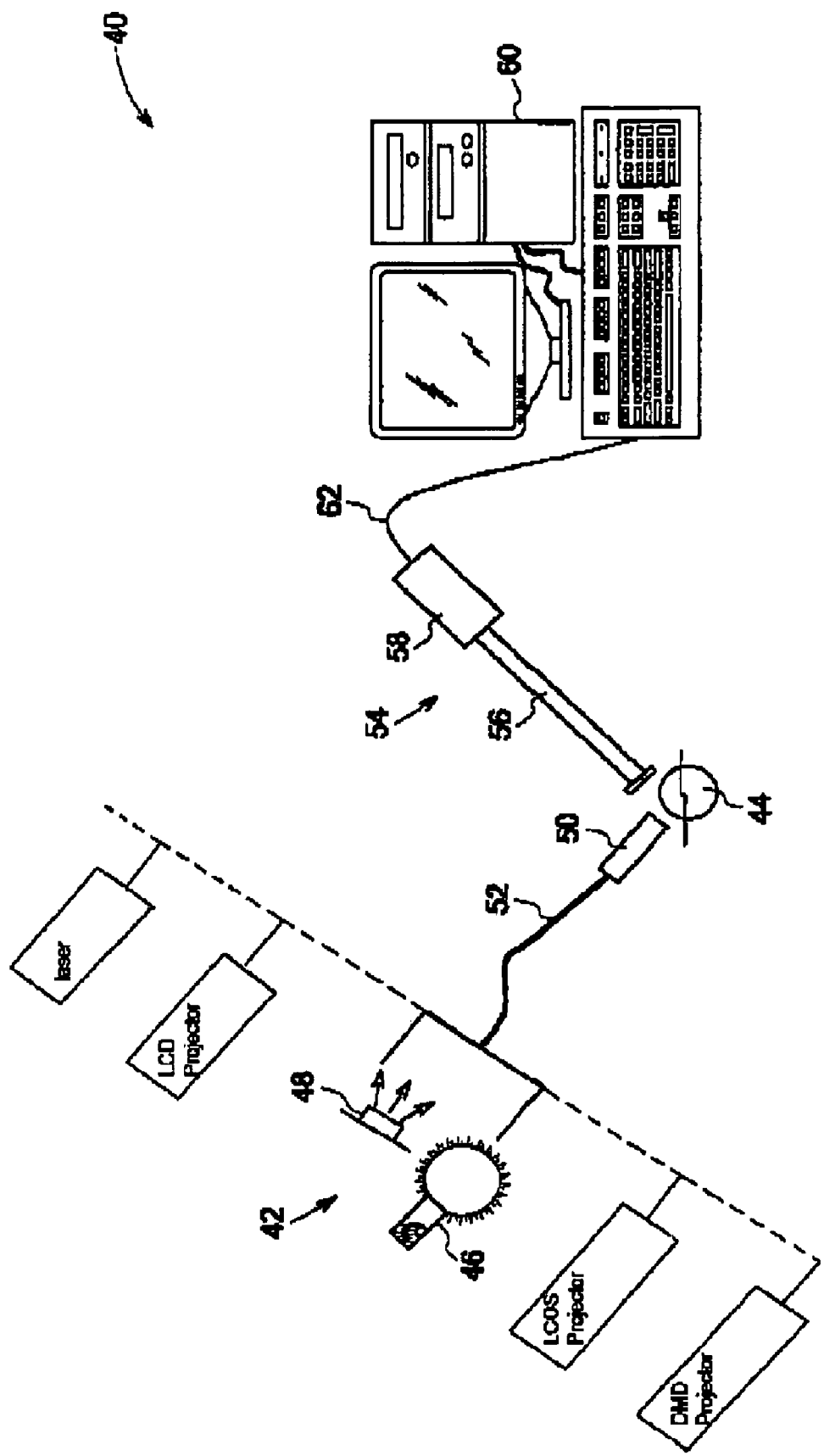
FIG. 3 is a diagrammatical illustration of an exemplary configuration of the profilometry apparatus of FIG. 2 in accordance with aspects of the present technique.

FIG. 3 is a diagrammatical illustration of an exemplary configuration 40 of the profilometry apparatus 12 of FIG. 2.

The profilometry apparatus 40 includes a fringe projection device 42 configured to project a fringe pattern on an object 44 being formed or repaired via a machining system. The fringe projection device 42 projects a continuous sinusoidal fringe pattern onto the object surface. In an embodiment, the fringe projection device 42 projects the fringe pattern through a digital projector such as a Liquid Crystal Display (LCD), Digital Micromirror Device (DMD) or Liquid Crystal on Silicon (LCOS) projectors. In an alternate embodiment, the fringe projection device 42 projects the fringe pattern through a light source such as a laser, Light Emitting Diode (LED), or a lamp combined with diffraction components such as gratings and holographic components. In certain other embodiments, the fringe projection device 42 projects the fringe pattern through an optical interferometer layout.

In the illustrated embodiment, the fringe projection device 32 includes a light source such as a lamp 46 or a LED 48 and an optical head 50 coupled to the light source via an optical fiber 52 for light projection on the object 44. In addition, the profilometry apparatus 40 includes an optical unit 54 configured to capture an image of a distorted fringe pattern modulated by the object 44. In this exemplary embodiment, the optical unit 54 includes a high pass filter 56 and a camera 58 for capturing the image of the fringe pattern that is further transmitted to a signal processing unit 60 via a cable 62. In certain embodiments, the optical unit 54 includes a plurality of lens configured to capture the image of the distorted fringe pattern. In one embodiment, the optical unit 54 includes a borescope.

The signal processing unit 60 is configured to process the captured image from the optical unit 54 to filter noise from the captured image and to obtain real-time estimation of the parameters associated with the manufacture or repair of the object. Examples of such parameters include volume of the melt pool, height of accumulated layer, thickness of accumulated layer and so forth. It should be noted that the signal processing unit 60 may include a general purpose computer with appropriate programming for estimating the parameters and to facilitate the control of the process based upon the estimated parameters. In certain embodiments, the signal processing unit 60 may include a microcontroller. In an exemplary embodiment, the profilometry apparatus 40 employs Computer Numerical Control (CNC) to estimate the built height of the object 44 thereby eliminating the need of additional height sensors in the system 40. In operation, the signal processing unit 60 employs a pattern spacing analysis to filter the noise from the captured image from the optical unit 54. In this exemplary embodiment, the pattern spacing analysis includes Fourier Transform analysis. However, other types of pattern spacing analysis may be envisaged. More specifically, the signal processing unit 60 extracts a phase map of the distorted fringe pattern and estimates the parameters from this phase map. The extraction of phase map from the fringe pattern using Fourier Transform and estimation of parameters from the phase map is explained below.

In this exemplary embodiment, the image of the fringe pattern captured by the optical unit 54 is represented by the following equation:

$$I_k(i,j) = I_0(i,j)[1 + \gamma(i,j)\cos(\phi(i,j) + \delta_k)], k = 1,2,3 \ldots K \quad (1)$$

Where: k is the index number of images used in the phase measurement method;

I is the intensity at pixel (i,j);

$I_0$ is the background illumination;

γ is the fringe modulation representing image contrast;

$\delta_k$ is the initial phase for each individual image k; and

K is the total number of images.

For the image represented by equation (1) the two dimensional Fourier transform may be obtained as represented by the following equation:

$$M(u,v)=A(u,v)+C(u,v)+C^*(u,v) \quad (2)$$

Further, after applying a band-pass filter F(u,v), only C(u,v) is left that is represented by the following equation:

$$C(u,v)=M(u,v)F(u,v) \quad (3)$$

After inverse Fourier transforming, c(i,j) can be obtained as:

$$c(i,j) = \frac{1}{IJ}\sum_u \sum_v C(u,v)e^{2\pi i\left(\frac{ui}{I}+\frac{vj}{J}\right)} \quad (4)$$

Where: I and J are dimensions of pixel index.

Further, the phase value at each pixel (i,j) can be calculated as:

$$\phi(i,j) = \tan^{-1}\frac{I_m c(i,j)}{R_e c(i,j)} \quad (5)$$

Where: $I_m$ and $R_e$ stands for imaginary and real parts of complex number c(i,j).

Further, the profile of the weld pool may be obtained from the phase map and is represented by the following equation:

$$(x,y,z)=f_{x,y,z}(i,j,\phi(i,j)) \quad (6)$$

Thus, the profile of the weld pool including the parameters associated with the weld pool may be obtained from a single instantaneous image via the Fourier transform analysis as described above.

In certain embodiments, the signal processing unit 60 is configured to split the instantaneous image from the optical unit 54 into a plurality of images and the pattern of each image is shifted relative to other images. Further, the signal processing unit 60 is configured to generate a phase map from the plurality of images for estimating the parameters. It should be noted that the combination of light fringe projection along with the Fourier transform enables relatively easy filtering to remove the noise such as generated from the powder and background illumination. The phase information generated from the fringe pattern has a substantially high resolution and accuracy. In addition, the Fourier transform profilometry enables generation of the phase map from a single image thereby resulting in relatively less time for image processing and estimation of parameters of the weld pool.

The estimated parameters associated with the manufacture or repair of the object 44 may be utilized for process control of the machining system such as the laser consolidation system 10 described above with reference to FIG. 1. In particular, process parameters of the laser consolidation system 10 may be adjusted in response to the estimated parameters associated with the manufacture or repair of the object 44. Exemplary process parameters include laser power, powder flow rate, focus location, laser translation speed, slot size and combinations thereof. In certain embodiments, a control system (not shown) may be coupled to the machining system 10 for achieving a closed loop control of the system 10 based upon the estimated parameters. Beneficially, the estimation of phase map from a single instantaneous image through Fourier transform profilometry enables instant process control based upon the estimated parameters.

The generation of a structured light pattern in the profilometry apparatus 40 described above may be achieved through a plurality of configurations such as described below with reference to FIGS. 4-8. In particular, such exemplary configurations may be employed for the laser consolidation nozzle 30 (see FIG. 2) for generating a structured light pattern on the object 22 (see FIG. 2).

Figure 4:
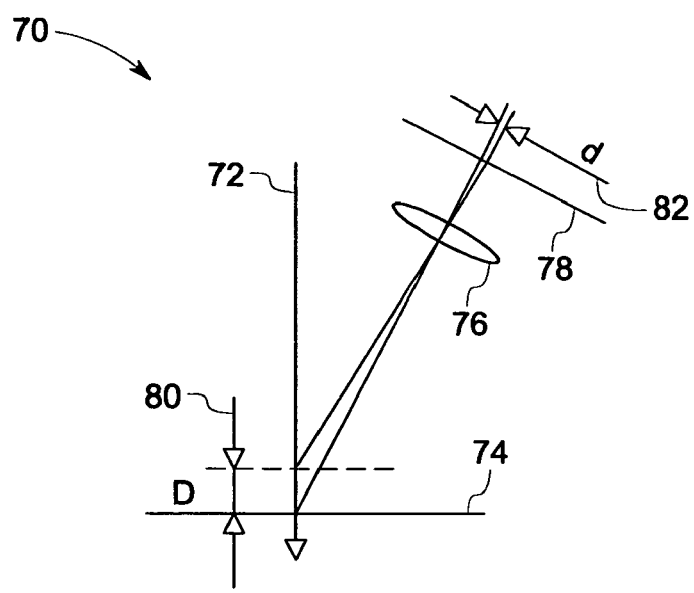
FIG. 4 is a diagrammatical illustration of an exemplary configuration for generating a structured light pattern in the profilometry apparatus of FIG. 3 in accordance with aspects of the present technique.

FIG. 4 is a diagrammatical illustration of an exemplary configuration 70 for generating a structured light pattern in the profilometry apparatus 40 of FIG. 3. In the illustrated embodiment, a laser 72 is projected to form a spot at the surface of an object 74 to be measured. Further, an imaging lens 76 disposed at an angle to the laser beam 72 forms an image or picture of the laser spot that is captured through a camera 78. A change in surface height (D) 80 of the object 74 causes the imaged spot to shift laterally on this image plane by a distance (d) 82 which is used to estimate the change in surface height 80 by the triangle formed by the laser 72, laser spot and the camera 78.

Figure 5:
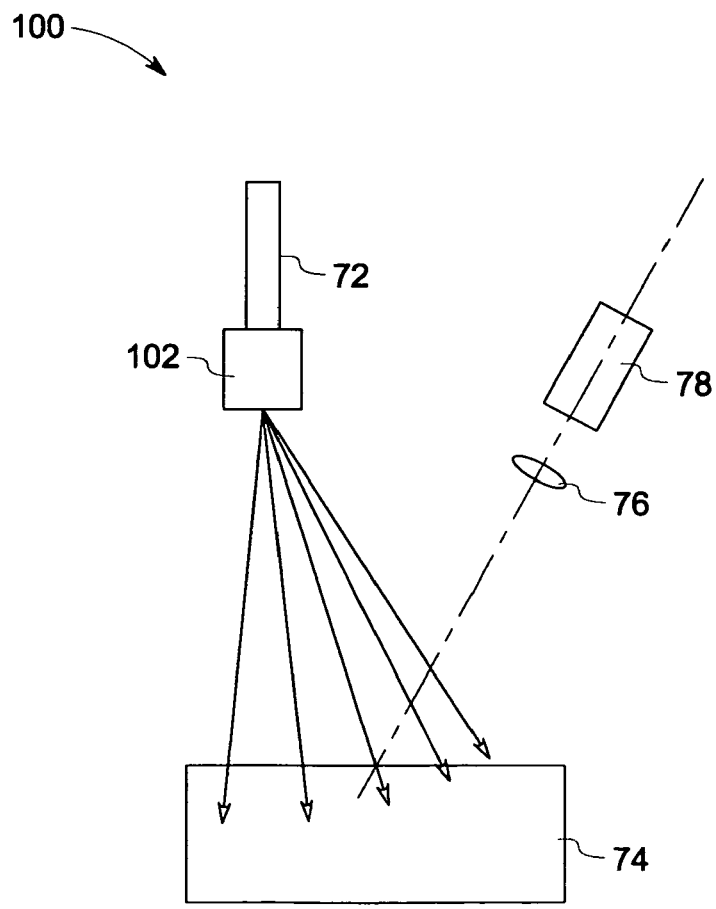
FIG. 5 is a diagrammatical illustration of another exemplary configuration for generating a structured light pattern in the profilometry apparatus of FIG. 3 in accordance with aspects of the present technique.

FIG. 5 is a diagrammatical illustration of another exemplary configuration 100 for generating a structured light pattern in the profilometry apparatus 40 of FIG. 3. As described above with reference to FIG. 4, this exemplary configuration 70 includes the laser 72, imaging lens 76 and camera 78. Further, in the illustrated embodiment, the fringe pattern is projected through the laser 72 and diffraction components 102. Examples of diffraction components include gratings and holographic components.

As described above, the fringe projection device 42 (see FIG. 3) of the profilometry apparatus 40 may project the fringe pattern through an optical interferometer layout that projects fringes. FIGS. 6-9 illustrate exemplary system configurations for optical interferometer layout for projecting the fringe pattern.

Figure 6:
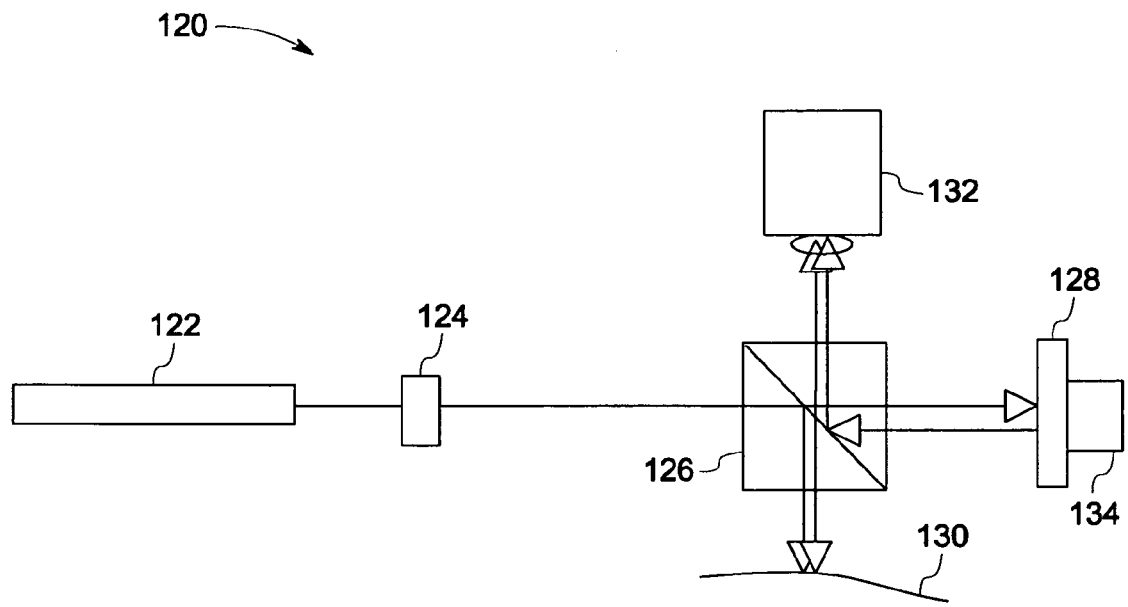
FIG. 6 is a diagrammatical illustration of an exemplary configuration of a full field interferometer for generating a fringe pattern in the profilometry apparatus of FIG. 3 in accordance with aspects of the present technique.

FIG. 6 is a diagrammatical illustration of an exemplary configuration 120 of a full field interferometer for generating a fringe pattern in the profilometry apparatus 40 of FIG. 3. In the illustrated embodiment, the interferometer includes a Michelson Interferometer. In operation, a beam emitted from a light source such as a laser 122 with a beam expander 124 is split into two beams of nearly equal intensity by a beam splitter 126. One of these beams is directed onto a reference mirror 128 while the other beam is directed onto an object surface 130. Further, the light produced by reflection of these two beams is made to interfere. When observed from a viewing port such as camera 132, interference occurs between the image of the mirror 128 and the image of the object surface 130. Since the light waves reflected by the object surface 130 and the mirror 128 originate from the splitting of the beam emitted by the same light source 122, these waves are mutually coherent, and consequently a two-beam interference pattern is generated. Further, the interferometric phase recovery may be achieved via phase shifting by a piezoelectric transducer (PZT) 134 phase-stepping. However, other known techniques may be employed to generate the phase map.

Figure 7:
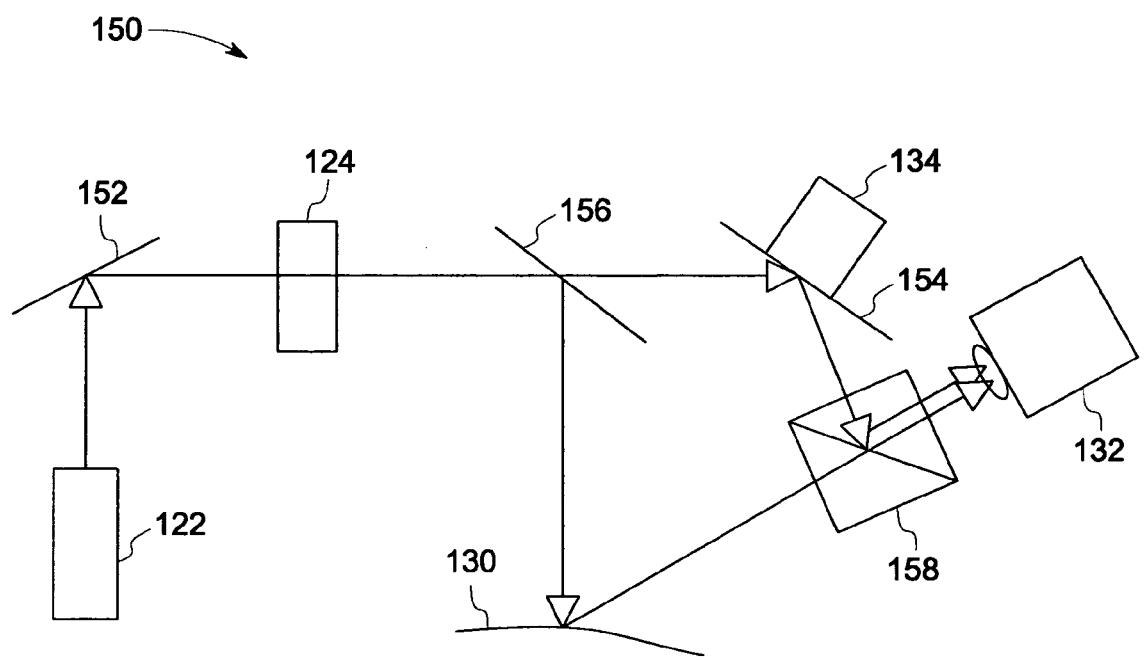
FIG. 7 is a diagrammatical illustration of another exemplary configuration of a full field interferometer for generating a fringe pattern in the profilometry apparatus of FIG. 3 in accordance with aspects of the present technique.

FIG. 7 is a diagrammatical illustration of another exemplary configuration 150 of a full field interferometer for generating a fringe pattern in the profilometry apparatus 40 of FIG. 3. In this exemplary embodiment, the interferometer 150 includes a digital holography interferometer that generates the fringe pattern through interference between the wave reflected or transmitted from the object to be imaged and a reference wave. As with the configuration illustrated in FIG. 6, the digital holography interferometer 150 includes the light source 122 with the beam expander 124 for generating a fringe pattern on the object 130. In addition, the interferometer 150 includes a mirrors 152 and 154 and beam splitters 156 and 158 for generating the object beam and the reference beam that are combined to generate the fringe pattern.

Figure 8:
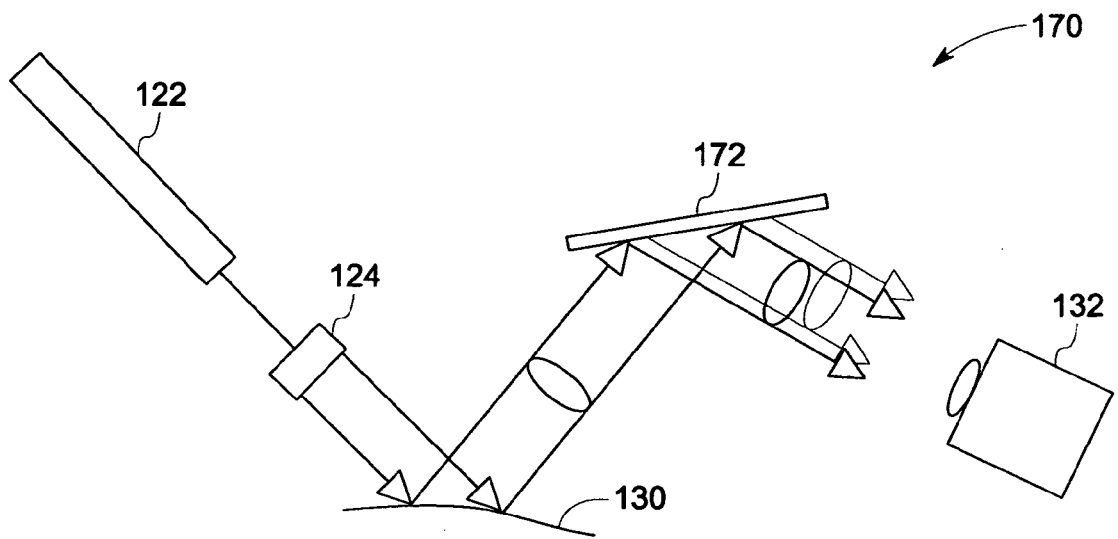
FIG. 8 is a diagrammatical illustration of another exemplary configuration of a full field interferometer for generating a fringe pattern in the profilometry apparatus of FIG. 3 in accordance with aspects of the present technique.

FIG. 8 is a diagrammatical illustration of another exemplary configuration 170 of a full field interferometer for generating a fringe pattern in the profilometry apparatus 40 of FIG. 3. In the illustrated embodiment, the interferometer 170 includes a shearing interferometer. The shearing interferometer 170 includes the light source 122 with the beam expander 124 for generating the fringe pattern on the object 130. In addition, the shearing interferometer 170 includes a shearing plate 172. The wavefronts from the object 130 are incident on the shearing plate at an angle of about 45 degrees and the reflected wavefronts from the shearing plate 172 are laterally sheared because of a finite thickness of the plate. Further, interference of the reflected wavefronts results in generation of the fringe pattern.

As will be appreciated by one skilled in the art, depending upon a desired resolution for an application, any of the above-described techniques may be employed for generating the fringe pattern on the object 44 via the fringe projection device 42 of FIG. 3. Further, an instantaneous image of the distorted fringe pattern corresponding to the object 44 is captured via the optical unit 54 that is processed via the signal processing unit 60 to estimate the parameters associated with the manufacture or repair of the object 44.

Figure 9:
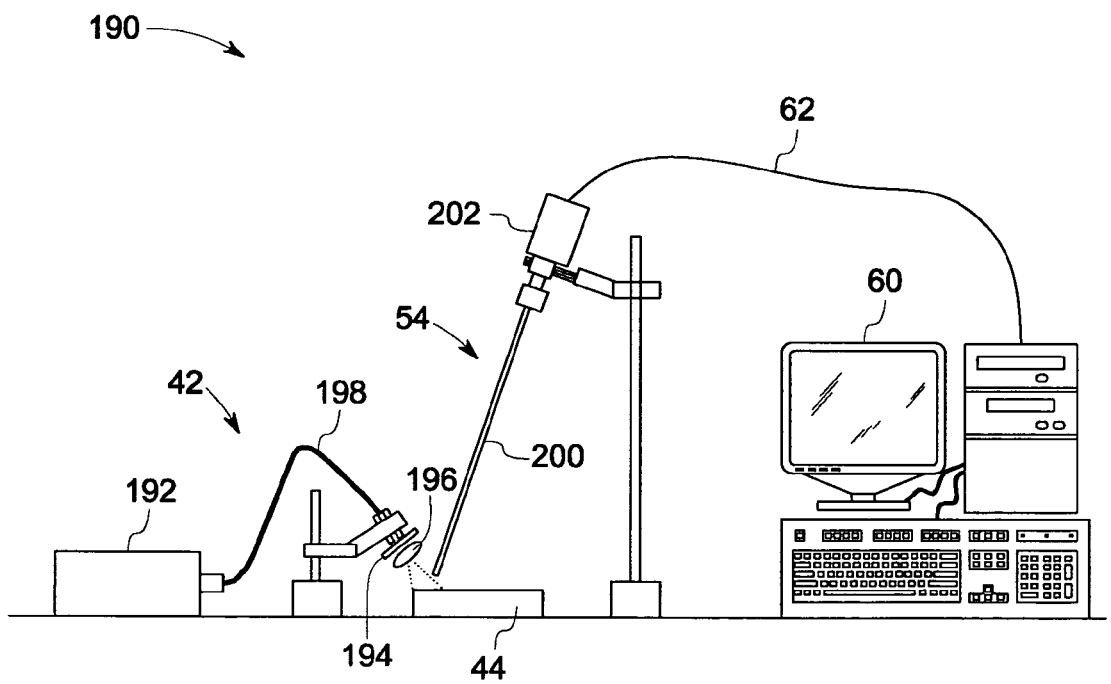
FIG. 9 is a diagrammatical illustration of another exemplary configuration of the profilometry apparatus of FIG. 1 in accordance with aspects of the present technique.

FIG. 9 is a diagrammatical illustration of another exemplary configuration 190 of the profilometry apparatus 12 of FIG. 1. The profilometry apparatus 190 includes the fringe projection device 42 configured to project a fringe pattern on the object 44. In the illustrated embodiment, the fringe projection device 42 includes a light source 192 coupled to a grating 194 and lens 196 through an optical fiber 198. In one exemplary embodiment, the grating 194 comprises a 250 PLI grating and the lens 196 comprises double convex lens. In addition, the profilometry apparatus 190 includes the optical unit 54 for capturing the image of the distorted fringe pattern modulated by the object 44. In this exemplary embodiment, the optical unit 54 includes a borescope 200 and a camera 202 that are coupled to the signal processing unit 60 via the cable 62. As described earlier, the captured image from the optical unit 54 is processed via the signal processing unit 60. The signal processing unit 60 extracts the phase map of the instantaneous image and estimates parameters associated with the machining operation of the object 44 without interfering with the machining process. In certain embodiments, a typical frame rate and processing may provide an update to the system at about 10 times per second that is substantially fast for feedback and control operations. Further, specialized image processing equipment optimized for this application along with high frame rate cameras may provide an update of about 100 times per second.

The various aspects of the method described hereinabove have utility in different machining applications. The technique illustrated above may be used for providing a real-time measurement of parameters associated with a manufacturing or repair operation of an object via a machining process. The technique may also be used for a closed loop control of the machining process based upon the estimated parameters to achieve a desired output. As noted above, even more generally, the method described herein employs a Fourier transform profilometry for estimating the parameters from a single instantaneous image by filtering noise from the system. Further, the technique is particularly advantageous to provide a profilometry apparatus with good resolution and accuracy and is cost effective that may be used for a wide range of machining applications.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A profilometry apparatus, comprising:
   a fringe projection device configured to project a fringe pattern on an object;
   an optical unit configured to capture a single set of pixel data corresponding to a single captured image of a distorted fringe pattern modulated by the object; and
   a programmable signal processing unit configured to process directly the single set of captured pixel data from the optical unit to filter noise from the image and extract a pixel phase map of the distorted fringe pattern there from to obtain real-time estimation of parameters associated with manufacture or repair of the object; wherein the single captured image is represented as
   $I_k(i,j)=I_o(i,j)[1+\gamma(i,j)\cos(\phi(i,j)+\delta_k)]$, k=1,2,3 . . . K, wherein k is the index number of the sub images used in the phase measurement, I is the intensity at pixel (i,j), $I_o$ is the background illumination, $\gamma$ is the fringe modulation representing image contrast, $\delta_k$ is the initial phase for each individual image k, and K is the total number of index sub images; and further wherein
   filtering noise from the image comprises obtaining a two dimensional Fourier transform for $I_k(i,j)$ and then band-pass filtering the two dimensional Fourier transform; and further wherein
   the pixel phase map is extracted directly from a plurality of pixel phase values determined from a set of complex numbers generated for the band-pass filtered two dimensional Fourier transform that is inverse transformed to generate the set of complex numbers.

2. The profilometry apparatus of claim 1, wherein the fringe projection device generates the fringe pattern through gratings, or an interferometer, or a digital fringe projection device.

3. The profilometry apparatus of claim 2, wherein the fringe projection device is configured to project a continuous sinusoidal fringe pattern on the object.

4. The profilometry apparatus of claim 1, wherein the fringe projection device comprises a Liquid Crystal Display (LCD), or a Digital Micromirror Device (DMD), or a Liquid Crystal on Silicon (LCOS) projector.

5. The profilometry apparatus of claim 1, wherein the fringe projection device comprises a Michelson interferometer, or a digital holography interferometer, or a shearing interferometer configured to project the fringe pattern on the object.

6. The profilometry apparatus of claim 1, wherein the optical unit comprises a plurality of lens configured to capture the image of the distorted fringe pattern.

7. The profilometry apparatus of claim 6, wherein the optical unit comprises a borescope.

8. The profilometry apparatus of claim 1, wherein the optical unit comprises a high pass filter and a camera configured to capture the image of the distorted fringe pattern.

9. The profilometry apparatus of claim 1, wherein the signal processing unit employs a pattern spacing analysis to filter the noise from the captured image from the optical unit.

10. The profilometry apparatus of claim 9, wherein the pattern spacing analysis comprises Fourier Transform analysis.

11. The profilometry apparatus of claim 1, wherein the profilometry apparatus is coupled to a laser consolidation nozzle of a laser consolidation system.

12. A manufacturing assembly, comprising:
a machining system having process parameters and configured to manufacture or repair an object;
a profilometry apparatus configured to provide a real-time estimation of parameters associated with the manufacture or repair of the object from a single image generated from the profilometry apparatus, wherein the profilometry apparatus comprises:
a fringe projection device configured to project a fringe pattern on the object;
an optical unit configured to capture a single set of pixel data corresponding to a single instantaneous image of a distorted fringe pattern modulated by the object; and
a programmable signal processing unit configured to process directly the single set of captured pixel data from the optical unit to filter noise from the image and extract a pixel phase map of the distorted fringe pattern there from to obtain real-time estimation of the parameters associated with the manufacture or repair of the object; and
a control system configured to adjust the process parameters of the machining system based upon the estimated parameters from the profilometry apparatus; wherein
the single captured image is represented as
$I_k(i,j)=I_o(i,j)[1+\gamma(i,j)\cos(\phi(i,j)+\delta_k)]$, k=1,2,3 ... K, wherein k is the index number of the sub images used in the phase measurement, I is the intensity at pixel (i,j). $I_o$ is the background illumination, $\gamma$ is the fringe modulation representing image contrast, $\delta_k$ is the initial phase for each individual image k, and K is the total number of index sub images; and further wherein
filtering noise from the image comprises obtaining a two dimensional Fourier transform for $I_k(i,j)$ and then band-pass filtering the two dimensional Fourier transform; and further wherein
the pixel phase map is extracted directly from a plurality of pixel phase values determined from a set of complex numbers generated for the band-pass filtered two dimensional Fourier transform that is inverse transformed to generate the set of complex numbers.

13. The manufacturing assembly of claim 12, wherein the machining system comprises a laser consolidation system and the process parameters comprise a laser power, or a powder flow rate, or a focus location, or a speed, or a slot size, or combinations thereof.

14. The manufacturing assembly of claim 13, wherein the profilometry apparatus is coupled to a laser consolidation nozzle of the laser consolidation system.

15. The manufacturing assembly of claim 12, wherein the parameters associated with the manufacture or repair of the object comprise volume of a weld pool, or height of accumulated layers of material, or thickness of accumulated layers of material, or combinations thereof.

16. The manufacturing assembly of claim 12, wherein the fringe projection device generates the fringe pattern through gratings, or an interferometer, or a digital fringe projection device.

17. The manufacturing assembly of claim 12, wherein the signal processing unit employs a pattern spacing analysis to filter the noise from the captured image from the optical unit.

18. A laser consolidation system, comprising:
a laser consolidation nozzle configured to form an object by providing a powder material in a laser generated melt pool;
a fringe projection arm coupled to the laser consolidation nozzle and configured to generate a fringe pattern on a top surface of the object;
an optical unit configured to capture a single set of pixel data corresponding to an instantaneous image of a distorted fringe pattern corresponding to the object; and
a programmable signal processing unit coupled to the optical unit and programmed to process directly the single set of captured pixel data from the optical unit to filter noise from the image and extract a pixel phase map of the distorted fringe pattern there from to estimate parameters associated with the manufacture or repair of the object through Fourier Transform analysis; wherein
the single captured image is represented as
$I_k(i,j)=I_o(i,j)[1+\gamma(i,j)\cos(\phi(i,j)+\delta_k)]$, k=1,2,3 ... K, wherein k is the index number of the sub images used in the phase measurement, I is the intensity at pixel (i,j). $I_o$ is the background illumination, $\gamma$ is the fringe modulation representing image contrast, $\delta_k$ is the initial phase for each individual image k, and K is the total number of index sub images; and further wherein
filtering noise from the image comprises obtaining a two dimensional Fourier transform for $I_k(i,j)$ and then band-pass filtering the two dimensional Fourier transform; and further wherein
the pixel phase map is extracted directly from a plurality of pixel phase values determined from a set of complex numbers generated for the band-pass filtered two dimensional Fourier transform that is inverse transformed to generate the set of complex numbers.

19. The laser consolidation system of claim 18, wherein the parameters associated with the manufacture or repair of the object comprise volume of a weld pool, or a height of accumulated layers of material, or a thickness of accumulated layers of material, or combinations thereof.

20. The laser consolidation system of claim 18, further comprising a control system configured to adjust process parameters of the laser consolidation system in response to estimated parameters associated with the manufacture or repair of the object.

21. The laser consolidation system of claim 20, wherein the process parameters comprise a laser power, or a powder flow rate, or a focus location, or a speed, or a slot size, or combinations thereof.

22. The laser consolidation system of claim 18, wherein the fringe projection device generates the fringe pattern through gratings, or an interferometer, or a digital fringe projection device.

23. The laser consolidation system of claim 18, wherein the optical unit comprises a plurality of lenses configured to capture the instantaneous image of the distorted fringe pattern.

24. The laser consolidation system of claim 23, wherein the optical unit comprises a borescope.

25. The laser consolidation system of claim 18, wherein the fringe projection arm is configured to generate a sinusoidal fringe pattern on the top surface of the object.

26. The laser consolidation system of claim 18, wherein the signal processing unit is configured to split the instantaneous image from the optical unit into a plurality of images and wherein each image is shifted relative to other images.

27. A method of controlling a process for manufacturing an object, comprising:
projecting a fringe pattern on the object;
capturing a single set of pixel data corresponding to an instantaneous image of a distorted fringe pattern corresponding to the object;

processing directly the single set of captured pixel data to filter noise and extract a pixel of the distorted fringe pattern based solely on the instantaneous image to estimate parameters associated with the manufacture or repair of the object via Fourier Transform analysis; and controlling process parameters for the manufacturing process in response to the estimated parameters associated with the manufacture or repair of the object; wherein.

the single captured image is represented as $I_k(i,j)=I_o(i,j)[1+\gamma(i,j)\cos(\phi(i,j)+\delta_k)]$, k=1,2,3 ... K, wherein k is the index number of the sub images used in the phase measurement, I is the intensity at pixel (i,j). $I_o$ is the background illumination, $\gamma$ is the fringe modulation representing image contrast, $\delta_k$ is the initial phase for each individual image k, and K is the total number of index sub images; and further wherein filtering noise from the image comprises obtaining a two dimensional Fourier transform for $I_k(i,j)$ and then band-pass filtering the two dimensional Fourier transform; and further wherein the pixel is extracted directly from a plurality of pixel phase values determined from a set of complex numbers generated for the band-pass filtered two dimensional Fourier transform that is inverse transformed to generate the set of complex numbers.

28. A method of estimating parameters of an object formed by a machining system, comprising:

coupling a profilometry apparatus to the machining system for providing a real-time estimation of parameters associated with the manufacture or repair of the object through directly signal processing a single set of captured pixel data corresponding to a single image generated from the profilometry apparatus, wherein the profilometry apparatus employs Fourier Transform analysis for estimating the parameters based on a pixel phase map extracted solely from the single image; wherein the single captured image is represented as $I_k(i,j)=I_o(i,j)[1+\gamma(i,j)\cos(\phi(i,j)+\delta_k)]$, k=1,2,3 ... K, wherein k is the index number of the sub images used in the phase measurement, I is the intensity at pixel (i,j). $I_o$ is the background illumination, $\gamma$ is the fringe modulation representing image contrast, $\delta_k$ is the initial phase for each individual image k, and K is the total number of index sub images; and further wherein the pixel phase map is extracted directly from a plurality of pixel phase values determined from a set of complex numbers generated for the band-pass filtered two dimensional Fourier transform for the single captured image that is inverse transformed to generate the set of complex numbers.

* * * * *

UNITED STATES PATENT AND TRADEMARK OFFICE
CERTIFICATE OF CORRECTION

| | | |
|---|---|---|
| PATENT NO. | : 7,595,894 B2 | Page 1 of 1 |
| APPLICATION NO. | : 11/445515 | |
| DATED | : September 29, 2009 | |
| INVENTOR(S) | : Hu et al. | |

It is certified that error appears in the above-identified patent and that said Letters Patent is hereby corrected as shown below:

In Column 8, Line 14, in Claim 1, delete "configured" and insert -- programmed --, therefor.

In Column 8, Line 23, in Claim 1, after "number of" delete "the".

In Column 8, Line 55, in Claim 6, delete "lens" and insert -- lenses --, therefor.

In Column 9, Line 17, in Claim 12, delete "configured" and insert -- programmed --, therefor.

In Column 9, Line 24, in Claim 12, after "adjust" delete "the".

In Column 9, Line 29, in Claim 12, after "number of" delete "the".

In Column 9, Line 30, in Claim 12, delete "(i,j). $I_o$" and insert -- (i,j), $I_o$ --, therefor.

In Column 9, Line 32, in Claim 12, delete "$\delta_k$is" and insert -- $\delta_k$ is --, therefor.

In Column 10, Line 16, in Claim 18, after "number of" delete "the".

In Column 10, Line 17, in Claim 18, delete "(i,j). $I_o$" and insert -- (i,j), $I_o$ --, therefor.

In Column 10, Line 19, in Claim 18, delete "$\delta_k$is" and insert -- $\delta_k$ is --, therefor.

In Column 11, Line 2, in Claim 27, after "pixel" insert -- phase map --.

In Column 11, Line 9, in Claim 27, delete "wherein." and insert -- wherein --, therefor.

In Column 11, Line 12, in Claim 27, after "number of" delete "the".

In Column 11, Line 13, in Claim 27, delete "(i,j). $I_o$" and insert -- (i,j), $I_o$ --, therefor.

In Column 11, Line 15, in Claim 27, delete "$\delta_k$is" and insert -- $\delta_k$ is --, therefor.

In Column 11, Line 22, in Claim 27, after "the pixel" insert -- phase map --.

In Column 12, Line 14, in Claim 28, after "number of" delete "the".

In Column 12, Line 15, in Claim 28, delete "(i,j). $I_o$" and insert -- (i,j), $I_o$ --, therefor.

In Column 12, Line 17, in Claim 28, delete "$\delta_k$is" and insert -- $\delta_k$ is --, therefor.

In Column 12, Line 22, in Claim 28, delete "the" and insert -- a --, therefor.

Signed and Sealed this
Sixteenth Day of August, 2011

David J. Kappos
*Director of the United States Patent and Trademark Office*